L. A. HUFSCHMIDT.
LIGHTING FIXTURE BOWL HOOK.
APPLICATION FILED MAY 19, 1919.
1,327,598.
Patented Jan. 6, 1920.
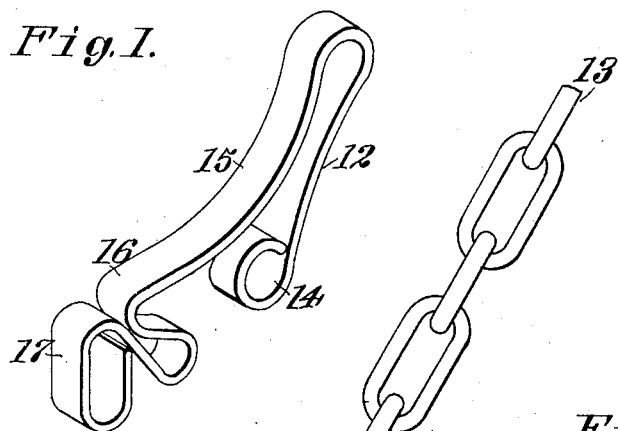
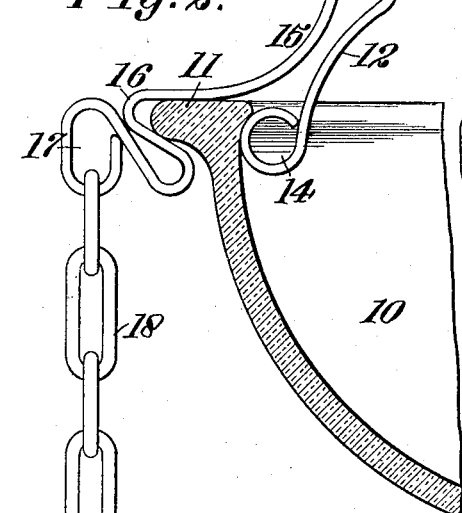
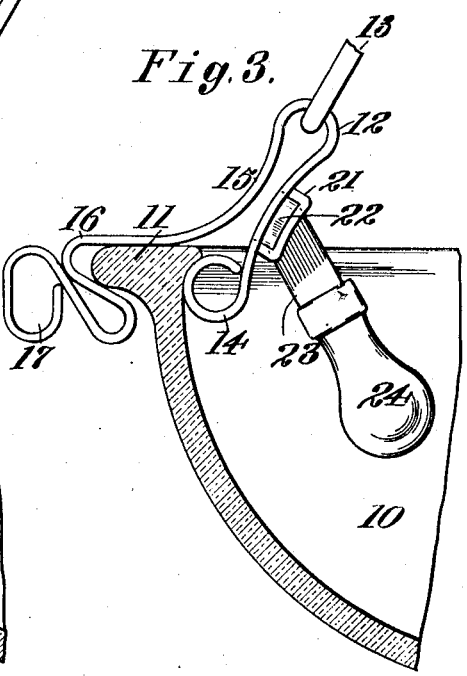
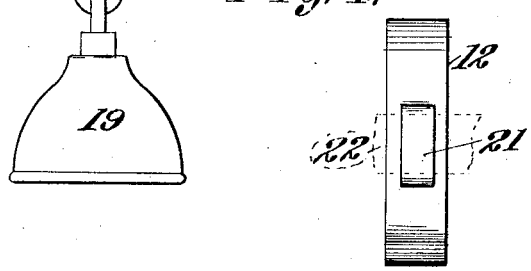
INVENTOR
Louis A. Hufschmidt
BY
Strong & Townsend
ATTORNEYS

UNITED STATES PATENT OFFICE.

LOUIS A. HUFSCHMIDT, OF SAN FRANCISCO, CALIFORNIA.

LIGHTING-FIXTURE BOWL-HOOK.

1,327,598.   Specification of Letters Patent.   Patented Jan. 6, 1920.

Application filed May 19, 1919. Serial No. 297,991.

*To all whom it may concern:*

Be it known that I, LOUIS A. HUFSCHMIDT, a citizen of the United States, residing at the city and county of San Francisco and State of California, have invented new and useful Improvements in Lighting-Fixture Bowl-Hooks, of which the following is a specification.

This invention relates to a lighting fixture particularly pertaining to a bowl hook therefor.

It is the principal object of the present invention to provide a bowl hook of simple construction and design, which will adapt itself to the rim of various lighting fixture bowls and will automatically clamp the rim as the weight of the bowl is suspended therefrom to hold the hook in its fixed relation thereto.

It is the further object of the present invention to provide a hook of such a design as to acommodate drop-lights and also to make it possible to detachably secure lighting sockets thereto.

The present invention contemplates the use of a metal clip formed of a single piece of bar steel bent to provide complementary locking jaws for gripping a bowl and further provided with means from which lighting fixtures may be suspended.

The invention is illustrated by way of example in the acompanying drawings, in which:

Figure 1 is a view in perspective illustrating the bowl hooks.

Fig. 2 is a view in section and elevation disclosing the hook as applied to a bowl and further fitted with a dependent lighting fixture.

Fig. 3 is a view similar to that shown in Fig. 2, disclosing the hook formed to support light fixtures extending within the bowl.

Fig. 4 is a view in elevation, showing the formation of the bowl hook to accommodate the fixture shown in Fig. 3.

Referring more particularly to the drawings, 10 indicates a bowl forming a part of a lighting fixture. This bowl is substantially semi-circular in construction and is shown in the present instance as formed with a marginal lip 11. In practice it has been proven, however, that the present invention will work equally well upon bowls having smooth lips, as the weight of the bowl and the peculiar formation of the clamping portion of the hooks will positively act to support the bowl therefrom.

The hook is formed with a chain loop 12 adapted to receive a supporting chain 13. One leg of this loop portion extends downwardly and inwardly and terminates in an eye portion 14 adapted to rest against the inner face of the bowl 10. The other leg of the loop 12 is arcuately formed as indicated at 15 and extends downwardly and outwardly over the lip of the bowl. The outer end of this portion is adapted to rest against the upper face of the lip and to coincide therewith. A loop 16 is formed at the outer end of the leg 15 and extends downwardly and beneath the lip 11 of the bowl. This loop is substantially V-shaped and will thus accommodate various sizes of lips as well as thicknesses. The lower end of the loop portion 16 is bent upwardly and outwardly to form an eye 17. This eye is provided as a connecting member for chains 18 to the lower ends of which lighting fixtures 19 are connected.

In some instances it may be found desirable to support lighting fixture sockets from the hook members and to allow these fixtures to extend into the bowl. For that reason the hooks may be formed as shown in Fig. 3, where it will be seen that a loop 21 is struck outwardly from the body portion of the inner leg of the chain loop 12. This loop is of proper dimensions to receive the shank 22 by which the lighting fixture bracket and socket 23 are detachably supported. The socket is, of course, designed to receive an incandescent light bulb 24.

In operation of the present invention a plurality of bowl hooks as indicated at 9 are disposed around the lip of the bowl 10 and positioned with the eye portion 14 of each hook bearing against the inner face of the bowl and with the externally extending rim of the lip projecting into the loop 16 of the hook. When in this position the loop portion 12 of the hook will extend inwardly and upwardly and will substantially agree with the angle of inclination of the chains 13. These chains are customarily supported from a common central canopy. When the weight of the bowl is allowed to hang from the chain it will be evident that a direct pull will be exerted by the hook against the underface of the lip 11 and at the same time a pull will be exerted upwardly by the eye-portion 14 of the hook and against the inner lip. Due to the peculiar arrangement of the pressure point and the supporting point of the loop 12, there will be a binding action which will act to grip the lip of the bowl 10 and to hold it in its gripped position within the hook. In the event that it is desired to hang lighting fixtures 19 from the rim of the bowl, the chains 18 may be fitted within the eyes 17. This will provide a desirable lighting fixture and at the same time will place an additional weight upon the extending end portions of the hooks to exert additional pressure to the loop 16 and this assists in holding the bowl in its clamped position.

When lighting fixtures are intended to be used within the bowl and are not supported by the bowl directly, it is possible to mount these fixtures by inserting the shanks 22 of the bracket 23 within the openings formed by the strap 21, thus providing a combined hook and fixture support.

While I have shown the preferred form of my invention, it will be understood that various modifications might be made without departing from the spirit thereof, and it will be evident from the examination of the present structure that a very simple and inexpensive fixture hook will be provided, which will act in a positive manner to grip the lighting fixture bowl and at the same time to afford additional supporting means for various other lighting fixtures.

Having thus described my invention, what I claim and desire to secure by Letters Patent is:

1. A bowl hook for lighting fixtures comprising a single metal strip bent at one end to form a cylindrical portion adapted to bear against the inner face of a lighting fixture bowl and further formed with an upwardly and inwardly extending loop portion for receiving a supporting chain, the opposite terminating end of said strip having a V-shaped loop to receive the outer marginal edge of the bowl-lip and continuing downwardly and then outwardly from the lip to form an eye portion to receive an auxiliary lighting fixture chain.

2. A bowl hook for lighting fixtures comprising a single metal strip bent at one end to form a cylindrical portion adapted to bear against the inner face of a lighting fixture bowl and further formed with an upwardly and inwardly extending loop portion for receiving a supporting chain, the opposite terminating end of said strip having a V-shaped loop to receive the outer marginal edge of the bowl lip and continuing downwardly and then outwardly from the lip to form an eye portion to receive an auxiliary lighting fixture chain, and a loop portion struck outwardly from the metal strip to support a lighting fixture bracket.

In testimony whereof I have hereunto set my hand in the presence of two subscribing witnesses.

LOUIS A. HUFSCHMIDT.

Witnesses:
   JOHN H. HERRING,
   W. W. HEALEY.